(12) United States Patent
Wirth et al.

(10) Patent No.: US 7,963,107 B2
(45) Date of Patent: Jun. 21, 2011

(54) PROCEDURES FOR THE OPERATION OF AN INTERNAL COMBUSTION ENGINE'S PARTICLE FILTER AND THE MECHANISM FOR THE EXECUTION OF THE PROCEDURE

(75) Inventors: Ralf Wirth, Farmington Hills, MI (US); Dirk Samuelsen, Ludwigsburg (DE); Christian Post, Stuttgart (DE); Andre Wiedersberg, Albersroda (DE)

(73) Assignee: Robert Bosch GmbH, Stuttgart (DE)

( * ) Notice: Subject to any disclaimer, the term of this patent is extended or adjusted under 35 U.S.C. 154(b) by 1198 days.

(21) Appl. No.: 11/651,731

(22) Filed: Jan. 10, 2007

(65) Prior Publication Data

US 2010/0242444 A1 Sep. 30, 2010

(30) Foreign Application Priority Data

Jan. 19, 2006 (DE) .......................... 10 2006 002 640

(51) Int. Cl.
*F01N 3/00* (2006.01)
(52) U.S. Cl. .................. 60/295; 60/274; 60/285; 60/297
(58) Field of Classification Search .................... 60/274, 60/277, 285, 295, 297, 311
See application file for complete search history.

(56) References Cited

U.S. PATENT DOCUMENTS

| 6,490,857 | B2 * | 12/2002 | Sasaki | 60/278 |
| 6,644,022 | B2 * | 11/2003 | Hirota et al. | 60/297 |
| 6,851,258 | B2 * | 2/2005 | Kawashima et al. | 60/311 |
| 7,284,368 | B2 * | 10/2007 | Surnilla et al. | 60/285 |
| 7,587,888 | B2 * | 9/2009 | Shirakawa | 60/278 |
| 7,600,374 | B2 * | 10/2009 | Ueno | 60/295 |

FOREIGN PATENT DOCUMENTS

| DE | 199 06 287 A1 | 8/2000 |
| DE | 101 08 720 A1 | 9/2002 |
| DE | 101 18 878 A1 | 10/2002 |
| DE | 103 33 441 A1 | 2/2004 |
| DE | 10 2004 033 414 A1 | 2/2006 |

\* cited by examiner

*Primary Examiner* — Binh Q. Tran
(74) *Attorney, Agent, or Firm* — Merchant & Gould P.C.

(57) ABSTRACT

A procedure for the operation of an internal combustion engine is disclosed, in whose exhaust gas area a particle filter is arranged which is freed from the stored particles during a regeneration. A measure for a load of the combustion engine is compared to a load threshold value. An overrun cut-off, at which the fuel metering is completely suppressed, is carried out if the measure for the load falls below the load threshold value and if the engine speed of the combustion engine lies above an engine speed threshold value. The load threshold value that has been determined to a value higher than zero is further dependant on the particle filter's regeneration signal. The procedure aims to prevent the overheating of the particle filter during its regeneration.

12 Claims, 1 Drawing Sheet

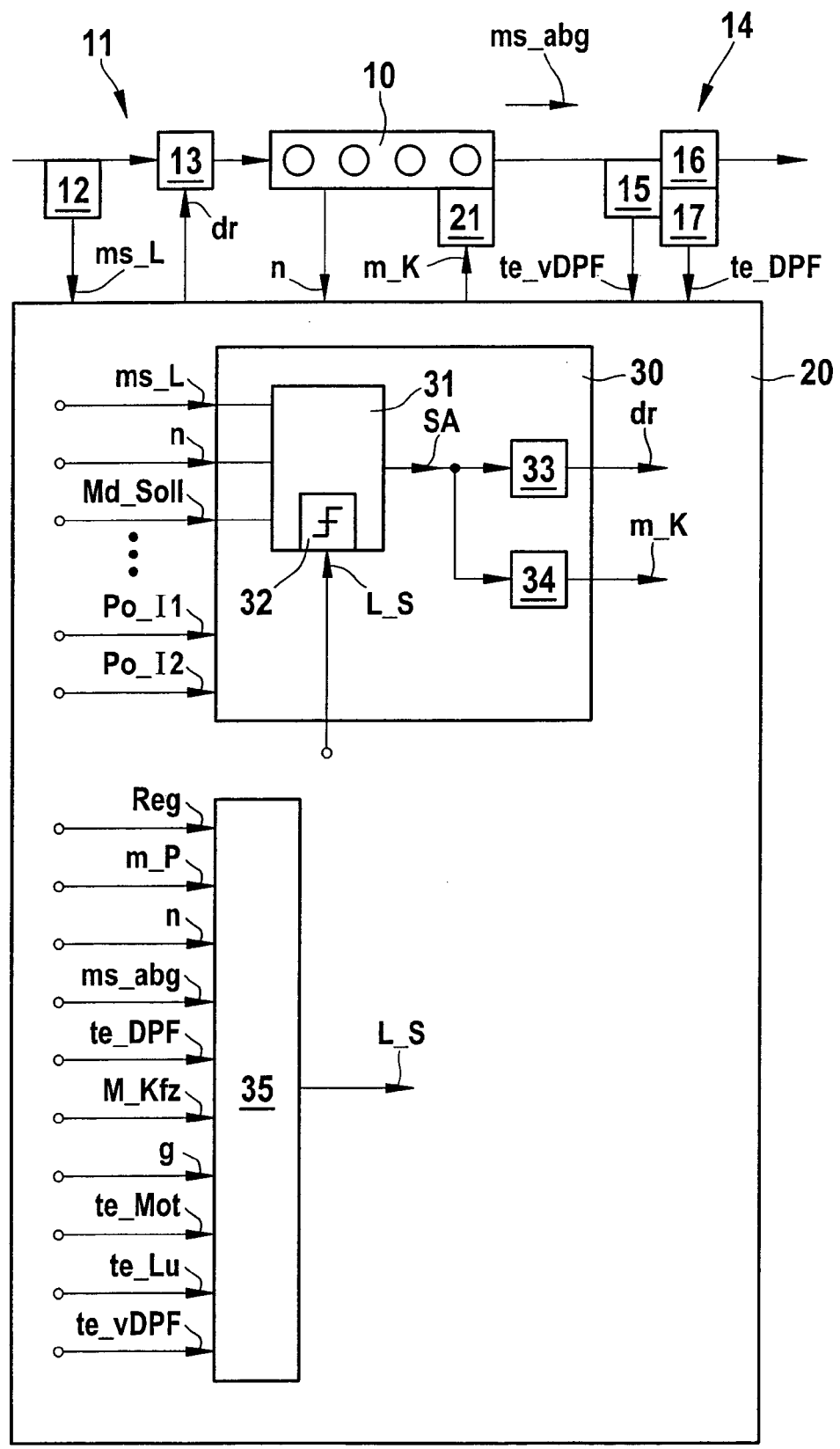

PROCEDURES FOR THE OPERATION OF AN INTERNAL COMBUSTION ENGINE'S PARTICLE FILTER AND THE MECHANISM FOR THE EXECUTION OF THE PROCEDURE

BACKGROUND

The invention is based on a procedure for operating a particle filter that is arranged in the exhaust gas area of a combustion engine and on a device for implementing the procedure.

DE 199 06 287 A1 describes a procedure for operating a particle filter of a combustion engine, which is regenerated if required. Without a conditioning of the particles the particles oxidize at a temperature of about 550° C. The required particle ignition temperature can be achieved with a reagent, for example uncombusted hydrocarbons, which is inserted into the exhaust gas area of the combustion engine, reacts exothermally at the catalytically working surface and therefore increases the exhaust gas temperature upstream in front of the particle filter.

In certain operating conditions of the combustion engine the case may occur that the regeneration runs uncontrollably fast because of the increased oxygen content of the exhaust gas. Due to the strong exothermic oxidization of the particles an inadmissibly high temperature increase in the particle filter may occur. In order to avoid such a condition DE 103 33 441 A1 suggests to influence the particle burning rate with the aid of the exhaust gas lambda. A nominal value for a lambda signal or a nominal value for a change of the lambda signal is predefined, which is compared to the measured exhaust gas lambda. Depending on the deviation between the nominal and the actual value a control signal is provided for a control element, which influences the oxygen concentration in the exhaust gas. An exhaust gas recirculation valve, a throttle valve etc can for example be provided as control element.

DE 101 08 720 A1 also describes a procedure and a device for controlling a combustion engine, which contains a particle filter, which is arranged in the exhaust gas area and which is regularly regenerated. Based on an operating parameter of the combustion engine and/or the particle filter a parameter is determined, which characterizes the intensity of the exothermic reaction in the particle filter during the regeneration. If the intensity parameter exceeds a threshold value, measures are taken for reducing the oxygen concentration in the exhaust gas in order to reduce the particle burning rate.

DE 199 06 287 A1 describes a further procedure for controlling a combustion engine, in whose exhaust gas area a particle filter is arranged. The temperature increase for starting the regeneration of the particle filter is achieved with a reagent, which is inserted into the exhaust gas area of the combustion engine upstream in front of the particle filter. Fuel is provided as reagent, which reacts in the exhaust gas area exothermally, for example on a catalytically working surface of a catalytic converter. The fuel gets into the exhaust gas area by adjusting the fuel injection timing, which causes an incomplete combustion of the fuel.

The insertion of fuel into the exhaust gas area of the combustion engine can be carried out according to DE 10 2004 033 414 A1 alternatively or additionally to the adjustment of the fuel injection timing by at least one fuel after-injection. Provided are at least a first and at least a second fuel after-injection. The first fuel after-injection is a fuel after-injection that is leaned on a main-injection, at which the injected fuel only combusts partially, so that uncombusted fuel gets into the exhaust gas area. The second fuel after-injection is a late fuel after-injection, at which the fuel does not combust anymore and gets mostly into the exhaust gas area.

The load condition of a particle filter can for example be determined according to DE 199 06 287 A1 with the aid of the determination of the difference pressure occurring at the particle filter.

DE 101 18 878 A1 describes a procedure for operating a combustion engine, at which an overrun cut-off is provided in order to save fuel. The overrun cut-off becomes active if the engine speed of the combustion engine lies above an engine speed threshold value and if simultaneously there is no load demand. A cooling off of a catalytic converter that is arranged in the exhaust gas area of the combustion engine is thereby avoided, in that the exhaust gas recirculation rate is increased during the overrun cut-off.

SUMMARY

The invention is based on the task to provide a procedure for operating a combustion engine, in whose exhaust gas area a particle filter is arranged, and a device for implementing the procedure, which avoid the occurrence of an inadmissibly high temperature in the particle filter.

The task is solved by the characteristics stated in the independent claims.

The procedure according to the invention for operating a combustion engine, in whose exhaust gas area a particle filter is arranged, which is freed from the stored particles during a regeneration, at which a measure for a load of the combustion engine is compared to a load threshold value and at which an overrun cut-off of the combustion engine is carried out, at which the fuel metering is completely suppressed, if the measure for the load of the combustion falls below the load threshold value and if the engine speed of the combustion engine lies above an engine speed threshold value, provides that the load threshold value is higher than zero and that the load threshold value is determined at least depending on a particle filter regeneration signal.

With the aid of trials it can be shown that during the reduction of the fuel amount that is provided to the combustion engine per work cycle of a cylinder, the combustion process becomes more and more instable up to a point, at which no combustion at all takes place.

An unstable combustion can in particular occur in connection with fuel after-injections. Fuel after-injections are distinguished as main combustion fuel after-injection, at which the after-injected fuel is mostly still combusted in the cylinder, and late fuel after-injections, with which specifically uncombusted hydrocarbons are inserted into the exhaust gas area of the combustion engine, which should react exothermally. Unstable conditions can in particular occur at the main combustion fuel after-injection at low fuel amounts, which increase if a comparably low fuel main-injection is predefined. A low fuel amount is connected to an increase of the possibility for combustion dropouts.

The procedure according to the invention avoids an uncontrollable oxygen input into the exhaust gas area upstream in front of the particle filter. A hazardous situation for the particle filter can in particular be given during a regeneration. During a regeneration an uncontrollable oxidization of the particles may occur at an excessive oxygen supply, which can cause an overheating of the particle filter. The excessive oxygen supply can also cause an undesired oxidization of combustible exhaust gas components, connected with an increase of the exhaust gas temperature, which also determines the particle filter temperature as input parameter.

The procedure according to the invention enables an adjustment of the threshold for the overrun cut-off by influencing the load threshold value depending on a particle filter regeneration signal, which signalizes whether the particle filter is regenerated or not and which contains an information about the course of the regeneration if necessary.

If the regeneration signal is not present the load threshold value can be determined as lower at an overrun cut-off. If the regeneration signal is present, an uncontrollable oxygen input into the exhaust gas area of the combustion engine is avoided at an overrun cut-off according to the procedure of the invention. If the regeneration signal is not only a digital signal, which signalizes the regeneration of the particle filter, but an information about the regeneration course, for example a measure for the particle burning rate, the load threshold value can be determined variably.

Advantageous improvements and configurations of the procedure according to the invention arise from the dependent claims.

One embodiment provides that the load threshold value depends on at least one parameter of the particle filter. Preferably a measure for the load status of the particle filter and/or the particle filter temperature is provided as parameter.

One embodiment provides that the load threshold value depends on at least one operating parameter of the combustion engine. The engine speed of the combustion engine and/or its operating temperature are preferably provided as operating parameter.

One embodiment provides that the load threshold value depends at least on one parameter of the exhaust gas. Preferably the exhaust gas flow and/or the exhaust gas temperature is provided as exhaust gas parameter.

One embodiment provides that the load threshold value depends on the engaged gear of a transmission and/or on the weight of a motor vehicle, in which the combustion engine is used as drive motor. With these measures the driving comfort is affected as little as possible.

One embodiment provides that during the overrun cut-off at least a further measure for suppressing an oxygen input into the exhaust gas area of the combustion engine is undertaken besides the suppression of the fuel metering. The complete closing of a throttle valve that is arranged in the intake area of the combustion engine can for example be provided. One embodiment provides that the transit from the fuel injection to the overrun cut-off and/or from the overrun cut-off to the fuel injection takes place according to a default time course. With this measure the driving comfort can be influenced during the transitions.

The device according to the invention for operating a combustion engine concerns at first a control unit, which is customized for implementing the procedure.

The control unit contains preferably at least one electric storage, in which the steps of the procedure are stored as computer program.

One embodiment provides that a throttle valve is arranged in the intake area of the combustion engine, which is closed at least during the overrun cut-off for suppressing the oxygen input into the exhaust gas area of the combustion engine.

Further advantageous improvements and configurations of the procedure according to the invention arise from further dependent claims and from the following description.

BRIEF DESCRIPTION OF THE DRAWING

The FIGURE shows a technical environment, in which a procedure according to the invention runs.

DETAILED DESCRIPTION

FIG. 1 shows a combustion engine 10, in whose intake area 11 an air detection 12 as well as a throttle valve 13 and in whose exhaust gas area 14 a first temperature sensor 15 and a second temperature sensor 17 that is assigned to a particle filter 16 are arranged. An exhaust gas flow ms_abg occurs in the exhaust gas area 14.

The air detection 12 provides an air signal ms_L to a control unit 20, the combustion engine 10 an engine speed n, a first temperature sensor 15 an exhaust gas temperature te_vDPF upstream in front of the particle filter 16 and the second temperature sensor 17 a particle filter temperature te_DPF.

The control unit 20 provides a throttle valve signal dr to the throttle valve 13 and a fuel signal m_K to a fuel metering device 21 that is assigned to the combustion engine 10.

The control unit 20 contains a fuel signal determination 30, which is supplied with the air signal ms_L, the engine speed n, a torque nominal value Md_Soll and signals of a first and second fuel after-injection Po_I1, Po_I2 and which provides the fuel signal m_K as well as the throttle valve signal dr.

The fuel signal determination 30 contains an overrun cut-off determination 31, which provides a comparator 32, which is supplied with the air signal ms_L, the engine speed n, the torque nominal value Md_Soll as well as a load threshold value L_S and which provides a signal for a overrun cut-off SA.

The signal for the overrun cut-off SA is provided to a throttle valve signal determination 33 as well as a ramp signal determination 34.

The control unit 20 contains furthermore a load threshold value determination 35, which is supplied with a signal of a regeneration Reg of the particle filter 16, a signal of a particle filter load status m_P, the engine speed n, the exhaust gas flow ms_abg, the particle filter temperature te_DPF, the mass_M_KfZ of a motor vehicle, an information about a gear g, a combustion engine temperature te_Mot as well as an ambient air temperature te_Lu and which provides the load threshold value L_S.

The procedure according to the invention works as follows:

The fuel signal determination 30 that is contained in the control unit 20 determines the fuel signal m_K for example depending on the air signal ms_L, on the engine speed n and on the torque nominal value Md_Soll as well as on other, not further labeled input parameters if necessary. The air signal ms_L provides the air detection 12, which detects the air mass or air volume that is supplied to the combustion engine 10.

The torque nominal value Md_Soll is for example derived from the position of a not further shown accelerator pedal of an also not further shown motor vehicle, in which the combustion engine 10 is arranged as drive motor.

The fuel signal determination 30 considers furthermore the first and if necessarily provided second fuel after-injection Po_I1, Po_I2, whereby the signals are supplied by a not further shown regeneration control.

From time to time the particle filter 16 that is arranged in the exhaust gas area 14 has to be regenerated from the stored particles. The regeneration takes place for example by a burn-up of the particles, which begins without a conditioning of the particles at temperatures above about 550° C. at present oxygen.

The required starting temperature for the burn-up of the particles can for example take place with a passive heating of the particle filter 16 by the exhaust gas temperature te_vDPF upstream in front of the particle filter 16. The exhaust gas temperature te_vDPF is detected by the first temperature sensor 15 and/or determined with the aid of a temperature model.

The temperature increase in the exhaust gas area 14 is for example obtained by an exothermic reaction of a reagent with oxygen. Fuel qualifies best as reagent, which is also supplied to the combustion engine 10.

The reagent can be supplied by inner-motorized measures, as for example a decline of the combustion for example by a late shift of the fuel main injection and/or by the at least one fuel after-injection Po_I1 Po_I2.

After initiating the particle filter regeneration the burning rate of the particles can be influenced by the oxygen concentration in the exhaust gas area 14 upstream in front of the particle filter 16. The particle burning rate has a significant influence upon the particle filter temperature te_DPF. The particle filter temperature te_DPF depends not only on the particle burning rate but also on the exhaust gas temperature to vDPF upstream in front of the particle filter 16 and in particular on the exhaust gas flow ms_agb. The exhaust gas flow ms_abg is for example an exhaust gas mass flow or an exhaust gas volume flow.

The particle filter temperature te_DPF is detected by the second temperature sensor 17 and/or can be determined with the aid of a temperature model. The second temperature sensor 17 can be arranged directly at the particle filter 16 or in particular directly downstream after the particle filter 16.

During a fuelled operation of the combustion engine 10 the oxygen concentration in the exhaust gas area 14 upstream in front of the particle filter 16 can be influenced by a not further shown lambda regulation. In special operating conditions of the combustion engine 10 an overrun cut-off SA of the combustion engine 10 can be carried out, at which the fuel supply to the combustion engine 10 is completely stopped. Such operating conditions are present if the engine speed n lies above a not further shown engine speed threshold value and if simultaneously the load of the combustion engine 10 equals zero.

A measure for the load of the combustion engine 10 is for example the torque nominal value Md_Soll. As measures for the load of the combustion engine 10 also other information can be used as for example an internal torque value or the fuel signal m_K itself. The load of the combustion engine 10 can for example be furthermore predefined by an idle-speed controller. In the following only the torque nominal value Md_Soll is mentioned as measure for the load Md_Soll of the combustion engine 10.

It has shown in trials that in particular at a low fuel metering into the individual cylinders of the combustion engine irregularities at the combustion of the fuel up to combustion dropouts can occur. Thereby the oxygen concentration and the concentration of uncombusted hydrocarbons in the exhaust gas area 14 can only be controlled very difficult.

An unstable combustion occurs in particular with a fuel after-injection Po_I1, which is attached to a fuel main-injection and which should at least partially burn in the cylinder. At low loads Md_Soll the level of the fuel amount that is supplied to the combustion engine 10 is overall reduced, so that an additional reduction of the fuel amount that is provided to the fuel main injection occurs by a relative shift of the fuel amount to the fuel after-injection, accompanied by an increase of the possibility for combustion dropouts.

An operating condition that is critical for the particle filter 16 is in particular given if the particle filter 16 is regenerated and the oxygen concentration in the exhaust gas area 14 upstream in front of the particle filter 16 increases uncontrollably. Due to the available oxygen the particle burning rate increases, accompanied by the danger of an overheating of the particle filter 16.

According to the invention it is provided to compare at least one measure for the load Md_Soll of the combustion engine 10 with the load threshold value L_S during an overrun cut-off of the combustion engine 10.

The overrun cut-off SA lies above a not further shown engine speed threshold value. Only in that case, an overrun cut-off SA is allowed. Furthermore it is checked during the overrun cut-off determination 31 whether the measure for the load Md_Soll of the combustion engine 10 falls below the load threshold value L_S. the checking takes place in the comparator 32. Only if both conditions are simultaneously fulfilled the overrun cut-off SA is induced.

The signal that displays the overrun cut-off SA is provided to the throttle valve determination 33 and to the ramp signal determination 34 in the shown embodiment.

According to the invention the load threshold value L_S is determined depending on the regeneration signal Reg, which is provided by a not further shown regeneration control. The regeneration signal Reg can be a digital signal, which only shows that a regeneration of the particle filter 16 takes place or not. Preferably the regeneration signal Reg additionally contains information for example about the particle burning rate and/or other information about the regeneration of the particle filter 16. In that case the load threshold value L_S can be pre-specified variably depending on the regeneration signal Reg. in particular a load threshold value L_S greater than zero is always pre-specified.

The load threshold value L_S is increased during a miming regeneration in order to increase the safety towards incomplete combustions in the individual cylinders of the combustion engine 10 and the therefore possible uncontrollable increase of the oxygen concentration in the exhaust gas area 14 upstream in front of the particle filter 16. Accordingly in less critical operating situations of the particle filter 16 a lowering of the load threshold value L_S can be carried out. In particular a variable regeneration signal Reg enables an intervention by lowering the load threshold value L_S, whereby for example a miming regeneration of the particle filter 16 has not to be interrupted.

The load threshold value L_S can depend on the load status m_P of the particle filter 16 with particles. The load threshold value L_S is increased with an increasing load status m_P.

The load threshold value L_S can depend on the engine speed n of the combustion engine 10, whereby the load threshold value L_S is increased with a sinking engine speed.

The load threshold value L_S can depend on the exhaust gas flow ms_abg, whereby the load threshold value L_S is increased at a low exhaust gas flow ms_abg. The load threshold value L_S can depend on the particle filter temperature te_DPF, whereby the load threshold value L_S is increased with an increasing particle filter temperature te_DPF.

The load threshold value L_S can depend on the mass M_KfZ of a motor vehicle, in which the combustion engine 10 is used as drive motor. With an increasing mass M_KfZ of the motor vehicle the load threshold value L_S can be increased, because the start of the overrun cut-off SA or the resumption of the fuelled operation of the combustion engine 10 are less noticeable at a higher mass M_KfZ.

The load threshold value L_S can depend on the engaged gear g of a transmission, whereby the load threshold value L_S is lowered at a low gear g.

The load threshold value L_S can furthermore depend on the temperature of the combustion engine te_Mot, whereby the loaf threshold value L_S is lowered at a high combustion engine temperature te_Mot.

Finally the load threshold value LS can depend on the ambient air temperature to Lu, whereby the load threshold value L_S is lowered at high ambient air temperatures to Lu.

The transition from the fuelled operation of the combustion engine 10 to the overrun cut-off SA and/or from the overrun cut-off SA to the fuelled operation can take place abruptly. An increase of the driving comfort can be obtained with a specifically pre-specified timely transition. With the ramp signal determination 34 the fuel signal m_K can be lowered to zero according to a predefined course of curve, for example linearly, from the last determined fuel signal m_K after falling below the load threshold value LS during the overrun cut-off SA or be booted up correspondingly from zero to the reset value of the fuel metering.

According to an embodiment it is provided that during the overrun cut-off SA further measures are undertaken, which influence an input of oxygen into the exhaust gas area 14 upstream in front of the particle filter 16. One measure provides for example the complete closing of the throttle valve 13 that is arranged in the intake area 11 of the combustion engine 10. During the overrun cut-off SA the throttle valve signal determination 33 pre-specifies the throttle valve signal dr for closing the throttle valve 13.

The invention claimed is:

1. A method of operating a combustion engine, which has a particle filter, freed of stored particles by a regeneration, to and is a part of an emission system, the method comprising:
    comparing a measured load of the combustion engine with a load threshold value;
    making an overrun cut-off where a fuel supply is entirely suppressed, when the measured load is lower than the load threshold value and when revolutions of the engine run above a revolutions threshold value, wherein the load threshold value is greater than null; and
    determining the load threshold value depending on at least a particle filter regeneration signal.

2. A method according to claim 1, wherein the load threshold value is at least dependant upon a nominal value of the particle filter.

3. A method according to claim 2, wherein the load threshold value is dependant upon at least one of an amount of the particle filter's load conditions and its temperature.

4. A method according to claim 1, wherein the load threshold value is dependant upon a combustion engine's nominal operating value.

5. A method according to claim 4, wherein the load threshold value is dependant on at least one of a combustion engine's revolutions and the operational temperature of the engine.

6. A method according to claim 1, wherein the load threshold value is at least dependant upon an emission flow nominal value.

7. A method according to claim 6, wherein the load threshold value is dependant of at least one of the emissions flow and an emission's temperature.

8. A method according to claim 1, wherein the load threshold value is dependant upon at least one of a chosen gear of a transmission and a mass of the vehicle, in which the combustion engine is utilized as a main driving force.

9. A method according to claim 1, further comprising during overrun cut-off, and next to a complete suppression of the fuel supply, taking at least a further measure to suppress a combustion engine's oxygen intake into the emission system.

10. A method according to claim 1, wherein a transition of fuel injection into the overrun cut-off and/or the overrun cut-off fuel injection, is regulated by specific procedures.

11. An arrangement for the operation of a combustion engine which has a particle filter, freed of stored particles by a regeneration, and is a part of its emission system, the arrangement comprising a control mechanism that compares a measured load of the combustion engine for a load with a load threshold value; makes an overrun cut-off, where a fuel supply is entirely suppressed, when the measured load is lower than the load threshold value and when revolutions of the engine run above a revolutions threshold value, wherein the load threshold value is greater than null; and, determines the load threshold value depending on at least a particle filter regeneration signal.

12. An arrangement according to claim 11, wherein an engine intake has a throttle valve arrayed to it that closes during the overrun cut-off suppressing an oxygen intake into the emission system.

* * * * *

UNITED STATES PATENT AND TRADEMARK OFFICE
CERTIFICATE OF CORRECTION

PATENT NO. : 7,963,107 B2  Page 1 of 1
APPLICATION NO. : 11/651731
DATED : June 21, 2011
INVENTOR(S) : Wirth et al.

It is certified that error appears in the above-identified patent and that said Letters Patent is hereby corrected as shown below:

Col. 6, line 32: "during a miming" should read --during a running--

Col. 6, line 43: "example a miming" should read --example a running--

Col. 7, line 5: "value LS can" should read --value L_S can--

Col. 7, line 6: "temperature to Lu, whereby" should read --temperature te_Lu, whereby--

Col. 7, line 7: "temperatures to Lu." should read --temperatures te_Lu.--

Col. 7, line 31, claim 1: "by a regeneration, to" should read --by a regeneration,--

Col. 8, line 32, claim 11: "combustion engine for a load with a" should read --combustion engine with a--

Signed and Sealed this
Seventeenth Day of January, 2012

David J. Kappos
*Director of the United States Patent and Trademark Office*